US009207659B1

(12) United States Patent
Sami

(10) Patent No.: US 9,207,659 B1
(45) Date of Patent: Dec. 8, 2015

(54) SYSTEM AND METHOD FOR AUTOMATING ELECTRICAL DEVICES AT A BUILDING STRUCTURE

(71) Applicant: Ameer Sami, Vienna, VA (US)

(72) Inventor: Ameer Sami, Vienna, VA (US)

(*) Notice: Subject to any disclaimer, the term of this patent is extended or adjusted under 35 U.S.C. 154(b) by 0 days.

(21) Appl. No.: 14/450,899

(22) Filed: Aug. 4, 2014

Related U.S. Application Data

(60) Provisional application No. 61/862,259, filed on Aug. 5, 2013.

(51) Int. Cl.
G05B 15/02 (2006.01)
H04L 12/28 (2006.01)

(52) U.S. Cl.
CPC ............ *G05B 15/02* (2013.01); *H04L 12/2829* (2013.01); *G05B 2219/2642* (2013.01)

(58) Field of Classification Search
None
See application file for complete search history.

(56) References Cited

U.S. PATENT DOCUMENTS

| 5,088,645 | A | 2/1992 | Bell |
| 6,400,265 | B1 | 6/2002 | Saylor et al. |
| 6,442,241 | B1 | 8/2002 | Tsumpes |
| 6,643,355 | B1 | 11/2003 | Tsumpes |
| 6,661,340 | B1 | 12/2003 | Saylor et al. |
| 6,965,313 | B1 | 11/2005 | Saylor et al. |
| 6,973,166 | B1 | 12/2005 | Tsumpes |
| 7,113,090 | B1 | 9/2006 | Saylor et al. |
| 7,619,512 | B2 | 11/2009 | Trundle et al. |
| 7,920,841 | B2 | 4/2011 | Martin et al. |
| 7,920,842 | B2 | 4/2011 | Martin et al. |
| 7,920,843 | B2 | 4/2011 | Martin et al. |
| 8,022,807 | B2 | 9/2011 | Martin et al. |
| 8,140,048 | B2 | 3/2012 | Martin et al. |
| 8,214,494 | B1 | 7/2012 | Slavin |
| 8,350,694 | B1 | 1/2013 | Trundle et al. |
| 8,350,697 | B2 | 1/2013 | Trundle et al. |
| 8,390,432 | B2 * | 3/2013 | Bae et al. .................... 340/10.5 |
| 8,395,494 | B2 | 3/2013 | Trundle et al. |
| 8,442,695 | B2 | 5/2013 | Imes et al. |
| 8,456,293 | B1 | 6/2013 | Trundle et al. |
| 8,467,763 | B2 | 6/2013 | Martin et al. |

(Continued)

FOREIGN PATENT DOCUMENTS

DE 102011052467 * 2/2013

OTHER PUBLICATIONS

International Search Report and The Written Opinion of the International Searching Authority, or the Declaration; PCT/US2014/049636; Dated Aug. 4, 2014.

*Primary Examiner* — Darrin Dunn
*Assistant Examiner* — Christopher E Everett
(74) *Attorney, Agent, or Firm* — Taft Stettinius + Hollister, LLP; Daniel Krieger

(57) ABSTRACT

An electrical control system for automatically controlling the operation of a plurality of electronic control units, each of which is operatively connected to one or more electrical devices. The electronic control units are configured to communicate with a client device having access to a user application configurable by a user. The user application is configured to automatically control the operation of the electrical devices, which include consumer appliances used at a home or business to perform functions such as cooking, cleaning, lighting, heating or refrigeration. Each of the electrical devices is operatively connected to one or more of the control units, each of which is programmed to operate according to the user application which is stored in the client device and/or the cloud as a user application.

10 Claims, 17 Drawing Sheets

(56) References Cited

U.S. PATENT DOCUMENTS

| | | |
|---|---|---|
| 8,493,202 B1 | 7/2013 | Trundle et al. |
| 8,520,072 B1 | 8/2013 | Slavin et al. |
| 8,521,131 B1 | 8/2013 | Ramalingam et al. |
| 8,525,665 B1 | 9/2013 | Trundle et al. |
| 8,531,294 B2 | 9/2013 | Slavin et al. |
| 8,577,392 B1 | 11/2013 | Pai et al. |
| 8,589,174 B2 * | 11/2013 | Nelson et al. ............. 705/2 |
| 8,659,417 B1 | 2/2014 | Trundle et al. |
| 8,674,816 B2 | 3/2014 | Trundle et al. |
| 8,675,066 B2 | 3/2014 | Trundle et al. |
| 8,675,071 B1 | 3/2014 | Slavin et al. |
| 8,675,920 B2 | 3/2014 | Hanson et al. |
| 8,680,982 B2 | 3/2014 | Trundle et al. |
| 8,698,614 B1 | 4/2014 | Trundle et al. |
| 8,786,425 B1 | 7/2014 | Hutz |
| 8,812,136 B2 * | 8/2014 | Martin-Cocher et al. ...... 700/16 |
| 8,855,793 B2 | 10/2014 | Bhargava et al. |
| 2003/0229471 A1 * | 12/2003 | Guralnik et al. ............ 702/182 |
| 2004/0193548 A1 * | 9/2004 | Poth ............................. 705/63 |
| 2004/0243257 A1 * | 12/2004 | Theimer ....................... 700/44 |
| 2007/0043478 A1 * | 2/2007 | Ehlers et al. ................. 700/276 |
| 2007/0233285 A1 * | 10/2007 | Yamamoto .................... 700/28 |
| 2009/0057424 A1 * | 3/2009 | Sullivan et al. ............... 236/51 |
| 2009/0062964 A1 | 3/2009 | Sullivan |
| 2010/0127854 A1 * | 5/2010 | Helvick et al. ........ 340/539.14 |
| 2011/0046805 A1 * | 2/2011 | Bedros et al. ............... 700/291 |
| 2012/0143378 A1 | 6/2012 | Spears |
| 2012/0165993 A1 | 6/2012 | Whitehouse |
| 2012/0276878 A1 * | 11/2012 | Othmer et al. ............. 455/412.2 |
| 2012/0316808 A1 | 12/2012 | Frader-Thompson et al. |
| 2013/0060385 A1 | 3/2013 | Leen et al. |
| 2013/0073094 A1 | 3/2013 | Knapton et al. |
| 2013/0103221 A1 | 4/2013 | Raman |
| 2013/0103622 A1 * | 4/2013 | Matsuoka et al. ............. 706/12 |
| 2013/0144445 A1 | 6/2013 | Steinberg |
| 2014/0074257 A1 | 3/2014 | Bhargava et al. |
| 2014/0114484 A1 * | 4/2014 | Yamada et al. ............. 700/275 |
| 2014/0172176 A1 * | 6/2014 | Deilmann et al. ........... 700/275 |

\* cited by examiner

| TIME | DEVICE A | DEVICE B | DEVICE C | USER 1 | USER 2 |
|---|---|---|---|---|---|
| 9:15 | ON | ON | OFF | IN ROOM | OUT OF ROOM |
| 9:30 | ON | ON | OFF | IN ROOM | OUT OF ROOM |
| 9:45 | ON | ON | ON | IN ROOM | IN ROOM |
| 10:00 | ON | ON | ON | IN ROOM | IN ROOM |
| 10:15 | ON | ON | ON | IN ROOM | IN ROOM |
| 10:30 | ON | OFF | ON | OUT OF ROOM | IN ROOM |
| 10:45 | ON | OFF | ON | OUT OF ROOM | IN ROOM |
| 11:00 | ON | OFF | OFF | OUT OF ROOM | OUT OF ROOM |
| 11:15 | OFF | OFF | OFF | OUT OF ROOM | OUT OF ROOM |

FIG. 13

SYSTEM AND METHOD FOR AUTOMATING ELECTRICAL DEVICES AT A BUILDING STRUCTURE

RELATED APPLICATION

This application claims priority to U.S. Provisional Patent Application Ser. No. 61/862,259 entitled "System and Method for Automating Electronic Devices in a Building Structure" by Ameer Sami, filed Aug. 5, 2013, the disclosure of which is herein incorporated by reference in its entirety.

FIELD

The present application is directed to a system and method for automating electrical devices, and in particular to an intelligent system and method for automating the control of electrical devices at a building structure, such as a home or business, using a smartphone or tablet device.

BACKGROUND

A building automation system is an automated, electronically-controlled system that can provide centralized control of lighting, HVAC (heating, ventilation and air conditioning), appliances, security locks of gates and doors and other systems, to provide improved convenience, comfort, energy efficiency and security. Some elements of a building automation system include sensors (such as temperature, daylight, or motion detection), controllers (such as a general-purpose personal computer or a dedicated automation controller) and actuators, such as motorized valves, light switches, motors, and others. One or more human-machine interface devices are required so that occupants of the building structure can interact with the system for monitoring and control. This may be a specialized terminal located within the building structure.

SUMMARY

An adaptive electrical device control system monitors, learns and controls electrical devices include home appliances, consumer electronic devices, and electrical devices such as lamps, here collectively identified as "electrical devices", that are plugged into one or more electronic control units. The electrical devices are located at a home or a business where a user's habits or schedules are monitored to provide for the control of the operation of the electrical devices. The adaptive control system is used, in different embodiments, to control the operation of dumb and smart electrical devices. In one embodiment, one or more smart devices, such as mobile devices, are connected to other devices or networks through communication protocols such as Bluetooth, Near Field Communication (NFC), WiFi, 3G networks, 4G networks and other communication protocols. The smart device operates responsively to a communication received from other smart devices. The smart device also transmits information to other devices either to control the other devices or to indicate a status of the smart device. In another embodiment, "dumb" devices, those which do not include a communication device, are also controlled.

In addition, the devices are controlled according to a sensed motion of or a proximity to user activities. The system switches the devices on and off automatically when needed and/or when based on a user's activity within a predetermined environment, also identified herein as "context". Each device is assigned a unique identifier which is stored, in one embodiment, in the "cloud" of a cloud based environment, where the "cloud" is generally defined as the storing and accessing data and programs over the Internet instead of or in combination with using a computer's hard drive or memory. The adaptive electrical device control system enables the connected devices to obtain status information and control the attached devices automatically or manually by a device input or by an application based control system, wherein software of the application is configured to adapt to one or more users' habits and to enable control of the electrical devices.

In one embodiment, there is provided a method of controlling the operation of a plurality of electrical devices located at a building according to a user's schedule. The method includes sensing, by a plurality of control units each operatively connected to one of the plurality of electrical devices, an operation as initiated by a user of each of the electrical devices over a first period of time, storing the sensed operation of each of the electrical devices in a memory, and comparing the stored sensed operations with other stored sensed operations during the first period of time. The method further includes providing a schedule of the compared stored sensed operations based on compared stored sensed operations which are similar and controlling the operation of the plurality of electronic devices according to the provided schedule.

In another embodiment, there is provided a method of controlling the operation of a plurality of electrical devices located at a building according to a plurality of user's schedules. The method includes assigning, by a portable electronic device, a first identifier to a first user of the plurality of users, assigning, by the portable electronic device, a second identifier to a second user of the plurality of users, and determining, by a plurality of control units each operatively connected to one of the plurality of electrical devices, a first schedule for the first user and a second schedule for the second user, wherein each of the first and second schedules are configured to control the operation of the plurality of electrical devices according to the first schedule and the second schedule. The method further includes determining, by a first control unit of the plurality of control units, a location of the first user and the second user with respect to the first control unit based on the first and second identifiers and controlling the operation of the first control unit based on the determined location of the first user and second user.

In still another embodiment, there is provided an electrical device control system for controlling the operation of a plurality of electrical devices located at a building and configured to communicate with a client device utilized by a user. The control system includes a user application configured to be accessible by the client device, the user application configured to receive user data. A first control unit includes: (i) an electrical power connection configured to provide electrical power to one of the electrical devices; (ii) communication circuitry configured to communicate with the user application; and (iii) control circuitry operable to access data provided as input data to the client device, change a state of the electrical device, and determine a change in the state of the electrical device. A second control unit includes: (i) a user input component configured to respond to a user input; (ii) communication circuitry configured to communicate with the user application; and (iii) control circuitry operable to generate a signal in response to the user input and determine an identity of the user based on the generated signal. A third control unit includes: (i) an electrical power connection configured to provide electrical power to one of the electrical devices; (ii) a power port configured to provide electrical power to the client device; (iii) communication circuitry configured to communicate with the user application; and (iv)

control circuitry operable to change a condition of the electrical device and determine a change in the state of the electrical device.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 13 illustrates an example of the control system controlling three items in a single room based on two users.

DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
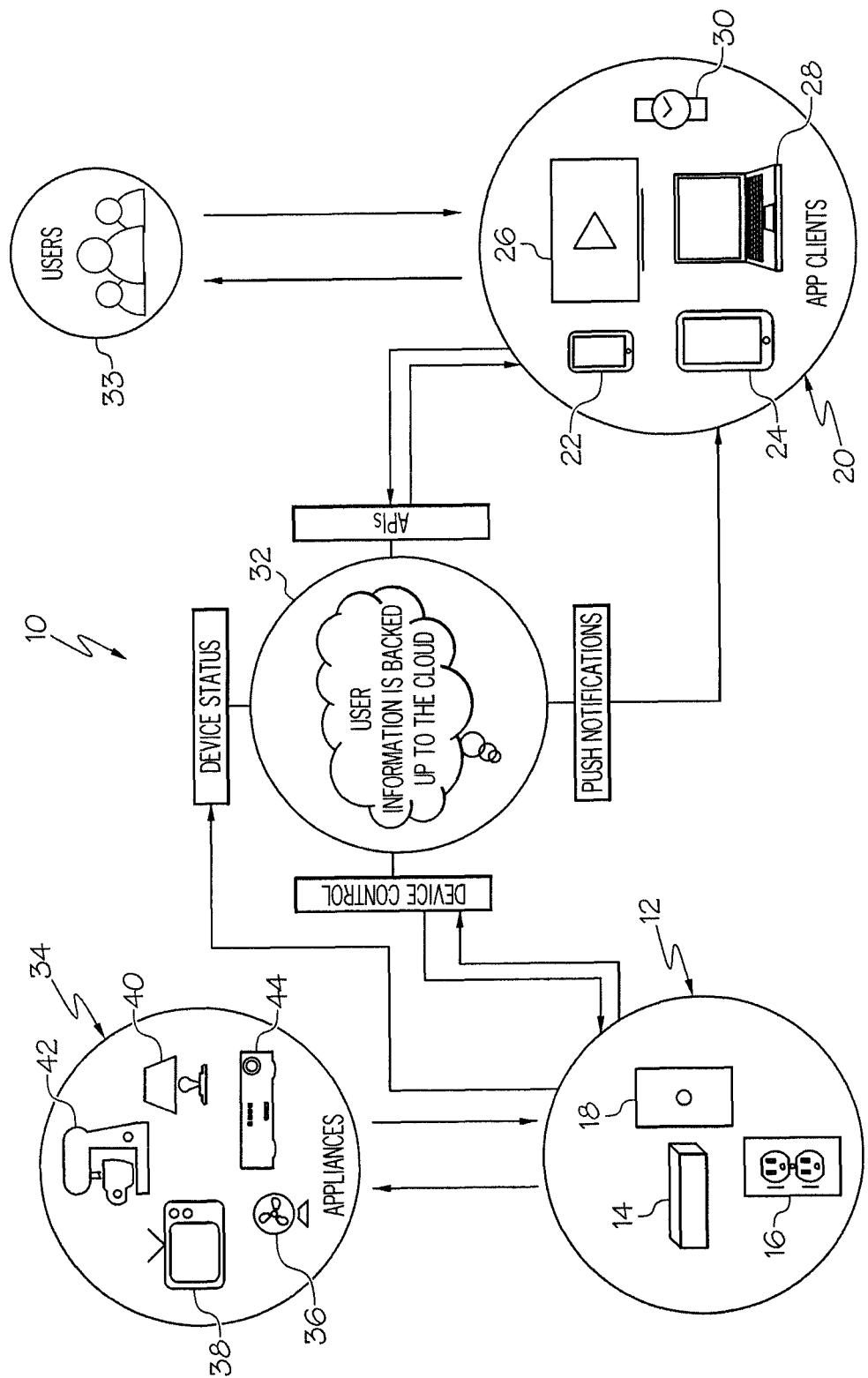
FIG. 1 illustrates an automated electrical device control system incorporating a user communication device, device control units coupled to electrical devices including appliances, and a cloud computing system.

FIG. 1 illustrates an overview of automation system 10 with a plurality of control units 12 including an outlet box control unit 14, a wall socket control unit 16 and a wall plate switch control unit 18, interacting with one or more user communication or client devices 20, which include a smartphone 22, a tablet device 24, a desktop computer 26, a laptop computer 28, and a smartwatch 30, also known as a computerized wristwatch. Each of the user communications devices 20 supports the use of a software application, also known as an "app" which communicates with the control units 12 through a cloud computing system 32, also known as the "cloud". The apps are stand-alone software applications which run on a user's device, such as the cell phone 22.

The applications described herein can be embodied as program code in software and/or firmware resident in one or more control units 12, one or more of the client devices, in the user interface of a client device, or in remote devices which are coupled to the system 10 through hardwired connections, wireless connection, connections to the internet, or other means of communication to software or firmware either wired or wireless.

The automation system 10 is an adaptive electrical control system configured to be controlled through the cloud by one or more users 33 interacting with one or more of the devices 20. By using the cloud, the adaptive control system leverages application programming interfaces (APIs) through the use of mobile, tablet, television, wearable devices, and personal computer (PC) application clients which bi-directionally communicate over communication protocols including Bluetooth, wifi, NFC, ethernet, and/or 3G communication networks or 4G communication networks.

The control system 10 is configured to enable a user 33 to interact with the adaptive electrical device control system in different ways. In one embodiment, the user interacts indirectly via a user sensing device, such as a motion sensor, a proximity sensor, or a laser sensor, which detects a presence of a user. The sensing device is triggered by the user when the user is in the proximity of the sensing device or when entering a portion of a space in a defined environment. In another embodiment, the user interacts directly with the adaptive electrical control device system and connected devices by using an application client on a cell phone, a mobile device, a television, a tablet, a wearable device, a personal computer, and/or other compatible device. The user 33, in another embodiment, interacts directly with the connected devices. The user 33 is enabled to check status, schedule tasks, and control functions of devices of the control device system using the client application. One or more user profiles and activity/command conflict resolution rules are provided.

In one embodiment, the user 33 initially logs into the user communication device 20 and the device receives signals identifying each of the control units 12 that are controllable by the user communication device 20, and therefore the user 33. The user 33 is presented with a list of control devices that are controllable and the user is allowed to select start-up times, in one embodiment for specific control devices. Each of the control devices control one or more appliances 34 such as a fan 36, a television 38, a light 40, a kitchen appliance 42, and a digital video disc (DVD) player 44. While certain embodiments are directed to the control of appliances, the embodiments are not limited to the control of only appliances and are directed to the control of any electrical device configured to perform a specific task, which includes entertainment, refrigeration, cooking, cleaning, lighting, HVAC (heating, ventilation and air conditioning), security devices, including video cameras and locks, and other systems.

Figure 2:
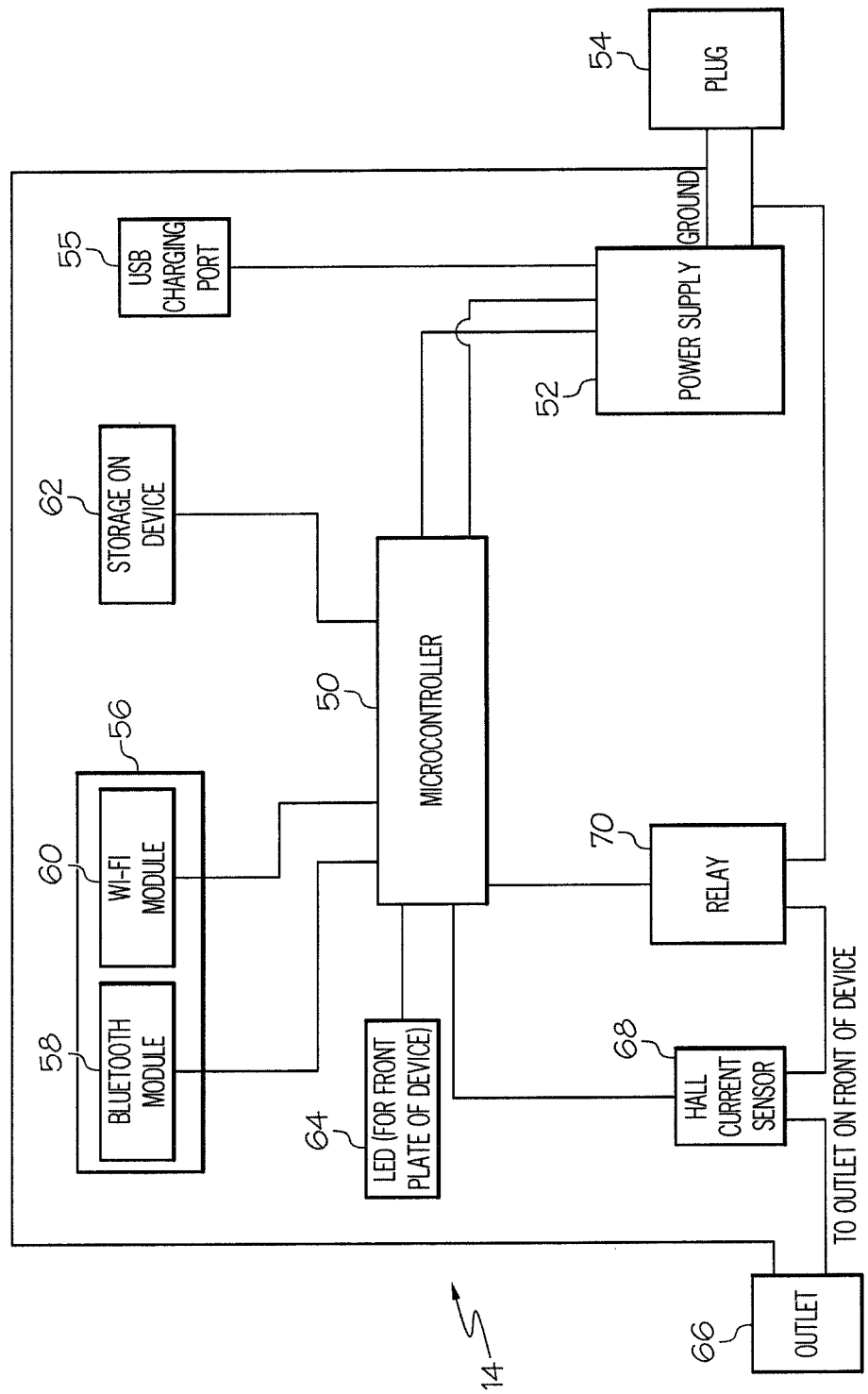
FIG. 2 is a schematic diagram of an outlet box control unit.
Figure 3:
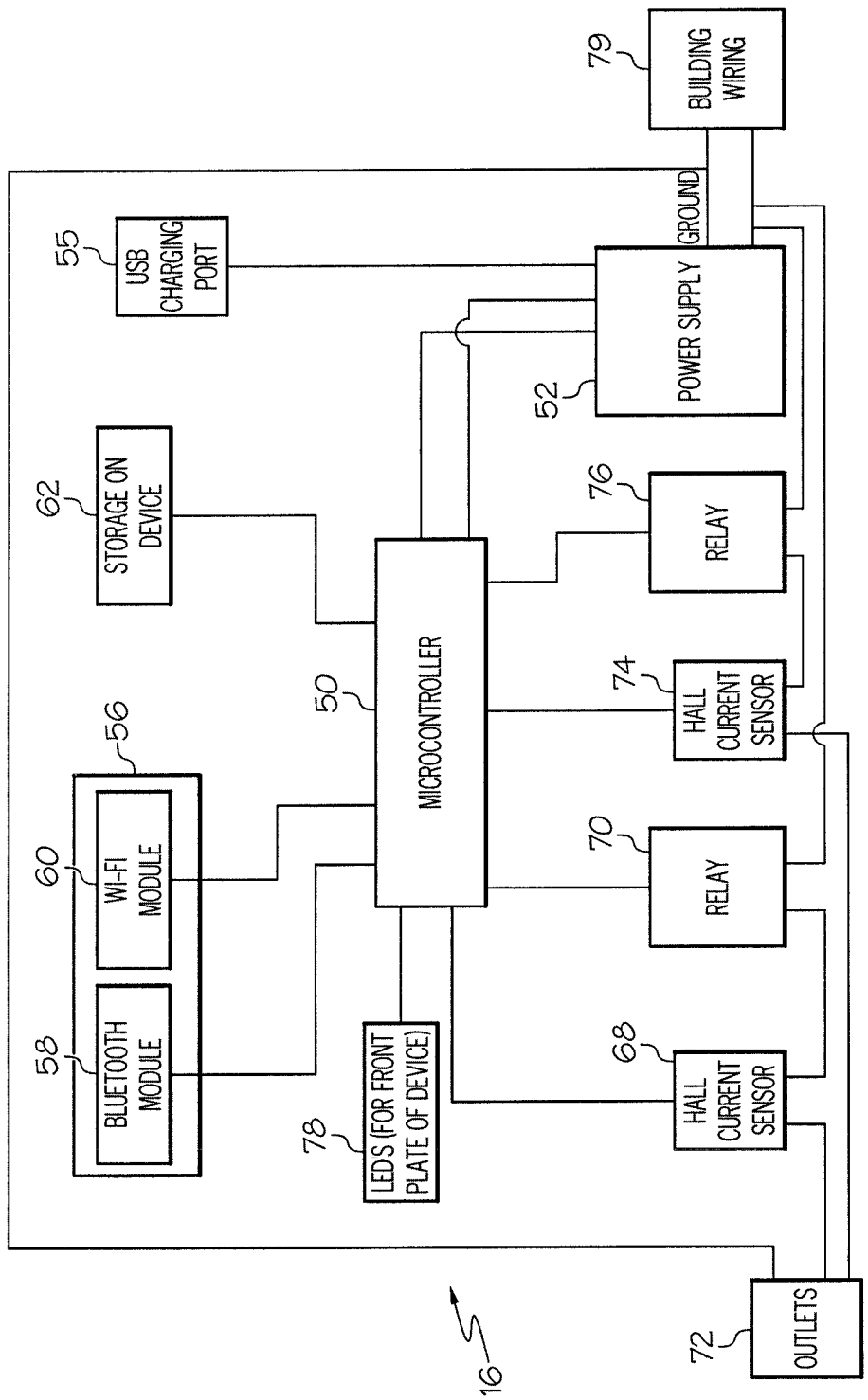
FIG. 3 is a schematic diagram of a wall socket control unit.
Figure 4:
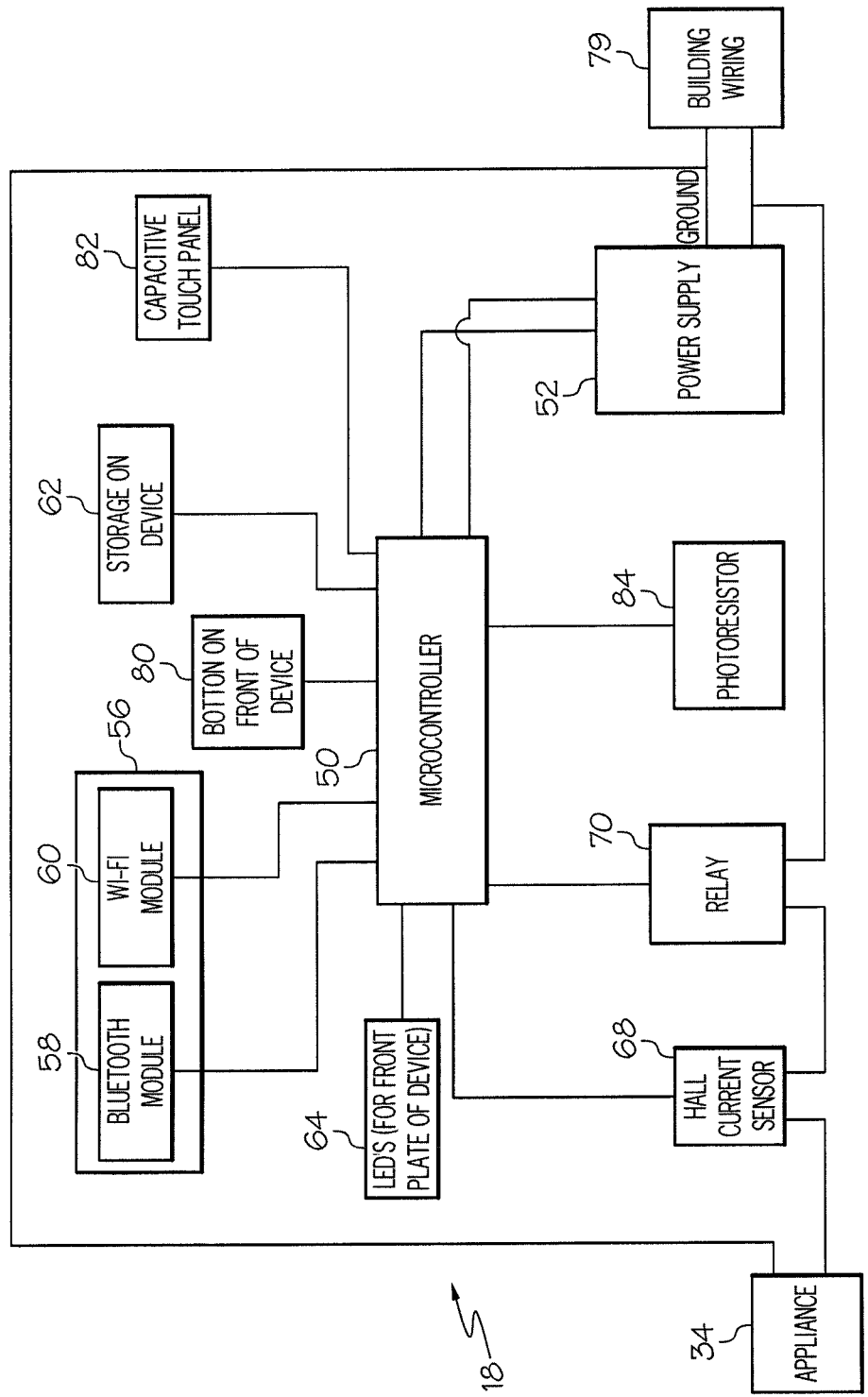
FIG. 4 is a schematic diagram of a wall plate switch control unit.

FIGS. 2, 3, and 4 respectively represent an electrical block diagram of the outlet box control unit 14, the wall socket control unit 16, and the wall plate switch control unit 18. Each of the devices is considered to be a smart device, as each includes a microcontroller configured to provide the functions described herein. In different embodiment, each of the outlet box control unit 14, the wall socket control unit 16, and the wall plate switch control unit 18, include computer processors, transitory and non-transitory computer memory, amp meters, wireless communication devices such as Bluetooth and 802.11 compliant wireless communicators, motion detectors, light meters, clocks, sound meters, and toggle switches for manually controlling the control units 14, 16, and 18.

As illustrated in FIG. 2, the outlet box control unit 14 includes a microcontroller 50 operatively connected to a power supply 52 which is coupled to a plug 54. The plug 54 is adapted to plug into a standard wall outlet and connects the power supply 52 to the standard voltage provided through the wall outlet. The power supply 52, in one embodiment, is a direct current (DC) power supply which converts the standard alternating current provided by the wall outlet to a DC voltage and current adapted to provide power to the microcontroller 50. A USB charging port 55 is also operatively coupled to the power supply 52 which provides power sufficient to charge one or more app clients 20. The outlet box 14 further includes communication circuitry 56, which in different embodiment includes one of, or both of, a Bluetooth module 58 and a wi-fi module 60. The communication circuitry 56 is configured to communicate with an internet service provider (ISP) or another device capable of communicating with an ISP using the standard internet protocol suite. Other communication modules are also contemplated as described herein. A memory 62 provides for data storage on the device 14 which holds data which the microcontroller 50 either has stored there or which is retrieved by the microcontroller 50.

The microcontroller 50 can include one or more individual controllers and can include at least one processor coupled to a memory. The microcontroller can include one or more processors (e.g. microprocessors), and the memory can include random access memory (RAM) devices comprising the main memory storage of the microcontroller, as well as any supplemental levels of memory, e.g., cache memories, non-volatile or backup memories (e.g. programmable or flash memories), read-only memories, etc.

An illumination device 64, such as a light emitting diode (LED) is located on a housing of the device at a location, such as a front plate, which is observable by the user. The illumination device 64, which is coupled to the microcontroller 50, receives a signal from the microcontroller to illuminate the device. In one embodiment, the signal provided by the microcontroller 50 indicates that the outlet box 14 is operative, where a non-illuminated light indicates that the outlet box is inoperative. In another embodiment, the microcontroller 50 provides a varying signal, such as a pulsed signal to repetitively turn the illumination device 64 on and off. In this embodiment, the pulsed signal indicates that one of the users has received a text message, a voice mail message, or an e-mail message at the user's client device. The microcontroller 50, however, is not limited to providing only alerts of this type, but other alerts are possible.

An outlet 66 is coupled to the plug 54 to provide the power available at the wall outlet to which the plug 54 is coupled. In addition, the outlet 66 is coupled to the microcontroller 50 through a current sensor 68, such as a Hall current sensor, which measures the amount of current drawn through the outlet 66 by an electrical device plugged into the outlet 66. In addition, a relay 70 is coupled between the current sensor 68 and the plug 54. The relay 70 is also coupled to the microcontroller 50. The relay 70 is turned on and off by the microcontroller 50, such that the power delivered to the electrical device through the outlet 66 controls the operation of the plugged-in appliance. The current sensor 68 provides to the microcontroller 50 a signal indicating that the plugged-in appliance is drawing current, thereby providing to the microcontroller 50 a status signal of the appliance. In addition, the microcontroller 50 is configured not only monitor the state of the appliance, on or off in one embodiment, but also record the time at which the appliance is turned on or off. By monitoring the state of the appliance as well as the operation times, the system 10 learns user habits to generate a schedule reflective of the user or users.

The outlet box control unit 14 is constructed such that when the outlet box control unit 14 is plugged into a standard two outlet wall electrical receptacle or electrical outlet, the outlet not used by the outlet box 14 is accessible for another electrical plug. While the illustrated outlet box control unit 14 includes one outlet for receiving a plug and controlling a device, in different embodiments, outlet boxes with multiple outlets are possible. Multi-outlet outlet boxes, in one embodiment, control each outlet individually such that multiple unique devices with different schedules are controlled by a single outlet box control unit 14, or in another embodiment, the multiple outlets are controlled in unison. Additionally, the outlet box control unit 14, in different embodiments, controls one outlet based on the usage or expected usage of another. For example, the two outlet box temporarily turns off a first device when a second device is being powered up and requires a large electrical current draw. After the start-up period of the second device, the outlet box control unit 14 repowers the first device. In yet another embodiment, the outlet box control unit 14 is constructed to be wired directly into a building's electrical system so that it may completely replace a standard two plug outlet in the wall, as described with respect to wall socket 18.

FIG. 3 illustrates an electronic block diagram of the wall socket control unit 16 which is configured similarly to the outlet box 14 of FIG. 2. Consequently, components in FIG. 3 which are similar in function to components of FIG. 2 are shown with the same element numbers. In addition to the previously described components of the outlet box control unit 14, the wall socket control unit 16 further includes two outlets 72, wherein, in one embodiment, the entire wall socket control unit 16 is configured to fit within a standard electrical box which is recessed in a wall. One of the two outlets is coupled to the previously described hall current sensor and relay 70, while the second outlet is coupled to a second hall current sensor 74 and a relay 76. The current sensor 74 and relay 76 are configured to operate as described above with respect to the current sensor 68 and relay 70. The wall socket 18 further includes multiple illumination devices 78 located on a front plate of the wall socket wherein one illumination device is associated with each of the two outlets 72. The wall socket control unit 16, in different embodiments, includes one or more USB charging ports 55. The power supply 52 is coupled to building wiring 79.

FIG. 4 illustrates an electronic block diagram of the wall plate switch control unit 18, which is configured similarly to the outlet box control unit 14 of FIG. 2. Consequently, components in FIG. 4 which are similar in function to components of FIG. 2 are shown with the same element numbers. The wall plate switch control unit 18 is configured to replace the standard wall switch and wall switch plate. In addition to the previously described components of the outlet box control unit 14, the wall plate switch control unit 18 includes a button 80 which is coupled to the microcontroller 50. The button 80 is accessible by a user and is configured to turn on or to turn off a connected electrical device by a user input. The button 80 is surrounded by at least one light that indicates to the user when the wall plate control unit 18 is about to perform an action. A capacitive touch panel 82 is also operatively coupled to the microcontroller 50 and is configured to enable a user to dim lights which are controlled through the wall plate control unit 18. Additionally, the wall plate control unit 18 includes a photoresistor 84 which is operatively connected to the microcontroller 50. The photoresistor 84 is configured to sense the presence of a user in the vicinity of the wall plate control unit 18 and provides a signal to the microcontroller 50 which is configured to identify the sensed user by tracking the user's identifying signal provided by the user's app client 20.

The wall plate control unit 18 includes a design similar to a standard switch plate that is mounted to a wall at a location where an electrical switch is disposed. The wall plate control unit 18 replaces the switch plate, such that one or more holes through which a screw or similar fastener can be used to mount the wall plate control unit 18 to a wall. In addition, the wall plate control unit includes the electrical switch or button 80 that triggers an electrical connection to an electrical device. For instance, actuation of the switch or button may trigger a light or ceiling fan on and off. In an exemplary embodiment, the wall plate control unit 18 includes a push button toggle in which users utilize the same action to both power and depower an object controlled by the wall plate.

Figure 5:
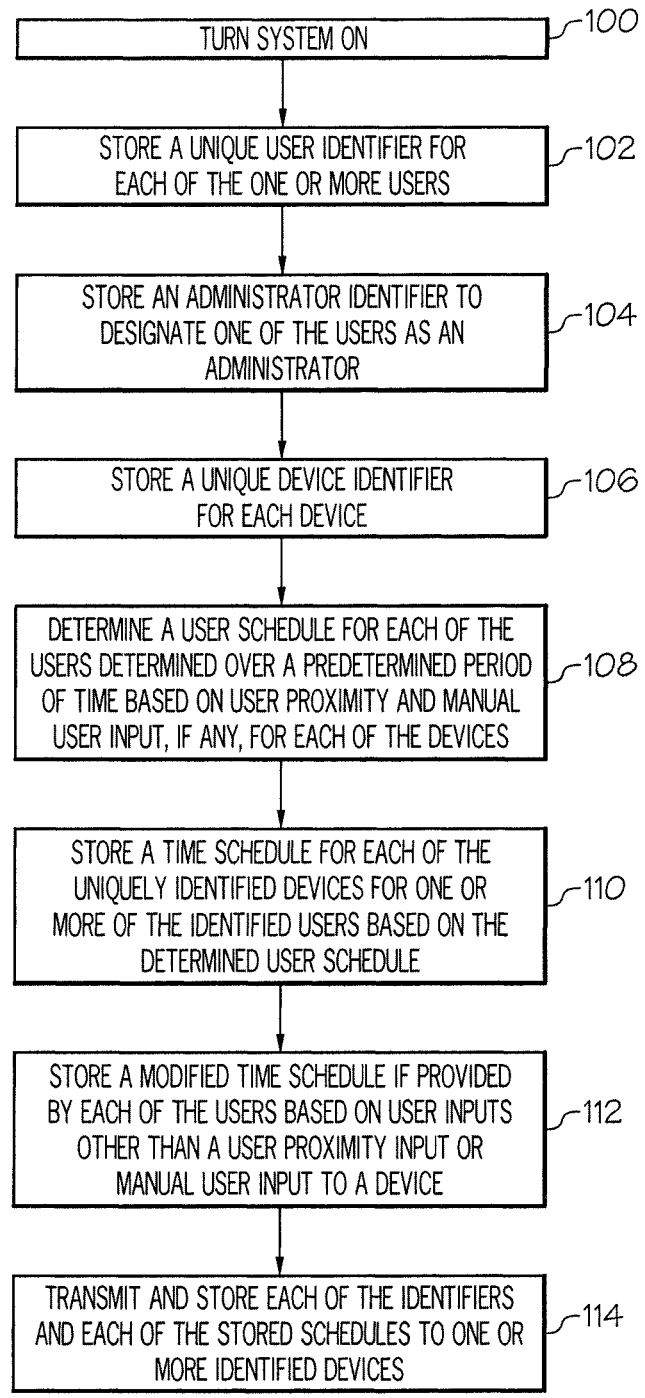
FIG. 5 is a flow diagram of a method to provide individual schedules for one or more users of an automated electrical device control system.

FIG. 5 illustrates one embodiment of a flow diagram of a method to provide individual schedules for one or more users of the automation system. As seen in FIG. 5, the system is turned on (block 100). Once turned on, a unique identifier is stored for each of the one or more users (block 102) who will be using the system. These unique identifiers are provided by the users or are generated by the user application in response to the user inputting the requested information into the user application. In some situations, a single user will be using the system, but in other situations, multiple users will be using the system. While not necessary in the situation of a single user, one of the users, in different embodiments having a plurality of users, is identified as an administrator and this identity is stored in the application (block 104) as an administrator identifier. In most situations, a user is identified by an actual name of the user or a pseudonym adopted by the user. Each of the names is associated with an electrical device used by the user such that the electrical device can be tracked throughout a building by the system (block 106). As used herein, all of the individuals using the system are considered to be users, and one of the users, in some embodiments, is also identified as an administrator or an administrative user. Those users, who are not considered to be an administrative user, are also called non-administrative users.

Figure 6:
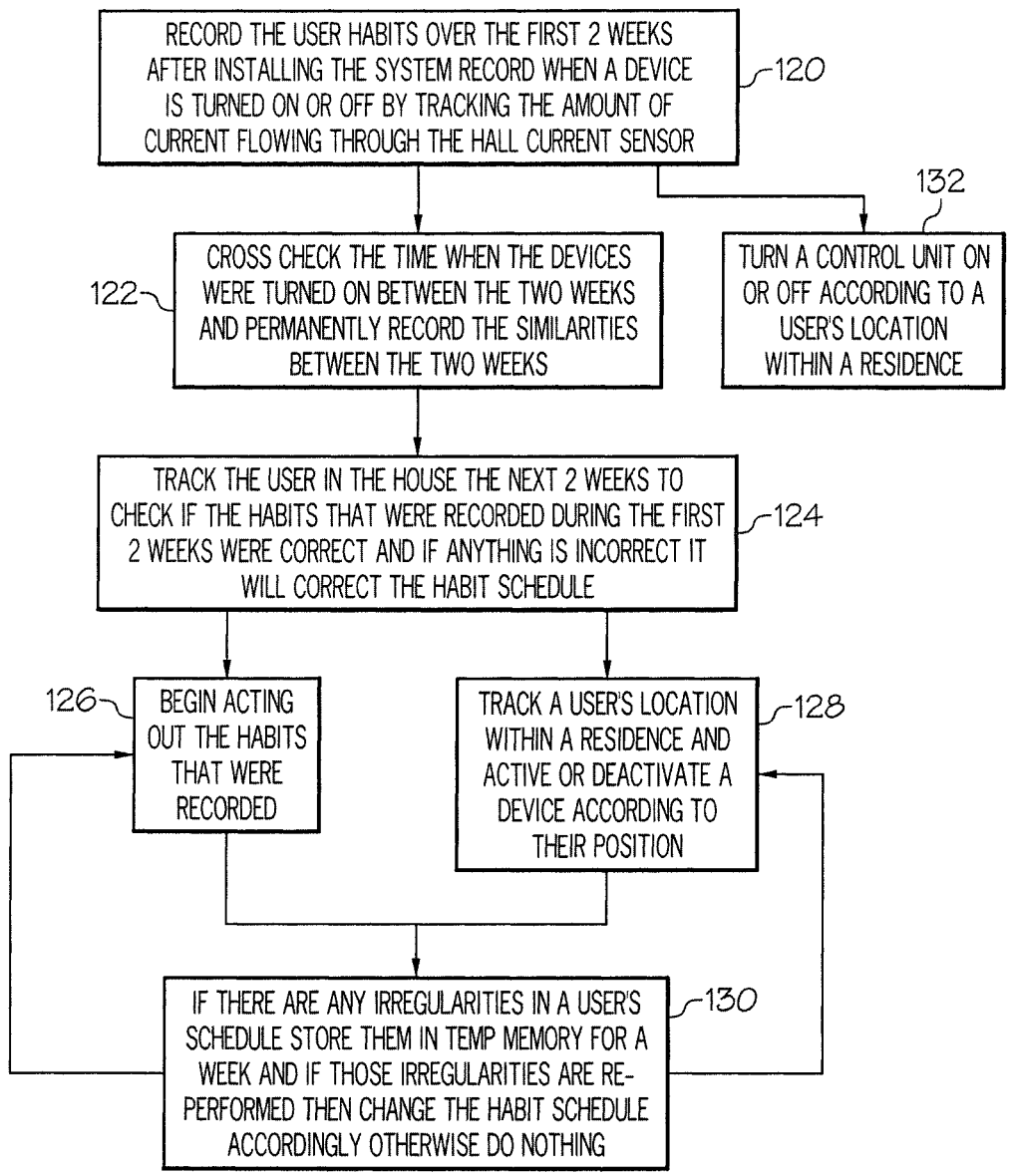
FIG. 6 is flow diagram of one embodiment of an automated electrical device control system operating in a learning mode to determine user schedules.

While in one embodiment the system is configured to operate in a manual mode where all of the electrical devices being controlled are scheduled according to user inputs through the application, the system in other embodiments is configured to automatically determine a user's schedule over a predetermined period of time (block 108) and as further described with respect to FIG. 6. During the predetermined period of time, the user's schedule is sensed, determined, stored and updated automatically by each of the units 12. As previously described, each of the devices includes a communication circuit which is configured to track the operations made to the connected devices by the identified user. This information is transmitted to the user's application which is configured to store a schedule of a devices usage or operation and to transmit the schedule to the cloud system (block 108). Once the predetermined period of time has elapsed, a final time schedule is stored for each of the uniquely identified devices associated with an identified user (block 110). Once stored, the user is able to modify the time schedule manually through the client device, such that the time schedule is adapted to the user's desired schedule (block 112). For instance, if the user determines that the lights are turned off at the end of the day at a certain time, the user may change the turn off time to a later time if desired. Once the schedule has been modified by a user, the modified schedule is transmitted to each of the units 12, such that operation of each of the units 12 is scheduled according to the user's schedule (block 114).

FIG. 6 is flow diagram of one embodiment of an automation system, located in a residence, operating in the learning mode to determine user schedules with respect to FIG. 5 and block 108. As illustrated in FIG. 6, the system 10 records each of the user's habits over a period of 2 weeks after installation of the device. The system 10 records when a device is turned on or off by tracking the current flowing through each of the units 12 as determined by the hall current sensors of each device. In some embodiments where an electrical device draws current at all times, a threshold level of current is established by the system to indicate a turning on or off of the device. In other embodiments, any amount of current sensed by the current sensor is used to determine the status of an electrical device (block 120). While the system 10 described in FIG. 6 is configured to operate in a residence, the present description is not limited to systems configured to operate in a residence, but is also applicable to other buildings and building locations including surrounding property.

Because many users maintain a routine schedule from one week to a following week, the habits are detected over the two week period of time where the first week's stored data is compared to the second week stored data. If there are similarities between the first week's stored data and the second week's stored data, the determined similarities are permanently recorded to construct a weekly time schedule (block 122). In addition, during the recording of habits made at block 120, the system turns on or off the electrical devices according to a user's location within a residence. These changes are recorded by the system 10 and used to construct the weekly time schedule of block 122.

Once the initial two week schedule has been determined, the electrical device usage within the residence is tracked an additional two weeks to determine whether the usage patterns, or habits, that were recorder during the initial two week period have been maintained. If so, these usage patterns are determined to be correct. If anything is determined to be incorrect, i.e. outside of the determined usage pattern, the system 10 updates or corrects the usage pattern with the new schedules or habits. During each of the initial schedules and any follow-up schedules, data reflecting usage patterns for each devices and the identity of the user following the usage pattern are stored (block 124).

Once the second two week pattern has been completed, the system 10 has stored a usage pattern which is followed from the end of that time period forward (block 126). At the same time, the user's location and a current pattern of use of the electrical devices is continuously monitored by the system (block 128). The current pattern of use is stored in a temporary memory for a one week period of time by the system. The stored current pattern is compared to the previously stored pattern and compared to the most recently updated two week stored pattern of use. If there are any differences or irregularities between the current pattern and the stored pattern, the previously stored pattern is updated (block 130) and the system continues to operate as before as described for blocks 126 and 128. While habits are being determined, the system 10 turns electrical devices on and off according to the user's location (block 132).

While one embodiment is described using a two-week period of time to determine a user's habit, other periods of time are also possible. For instance, in one embodiment a time period of four weeks is used to determine a user's pattern of usage of a period of four weeks. Such a time period is useful for a user who works two full workweeks of 12 hour days followed by two full weeks of time off. Consequently, the system described herein includes a default period of learning time of two weeks which can be changed and set to a preferred learning time of a user. In other embodiments, the learning period of time is set by a user with a selectable menu, such as a pull-down menu, which provides a selection of predetermined periods of learning time.

Figure 7A:
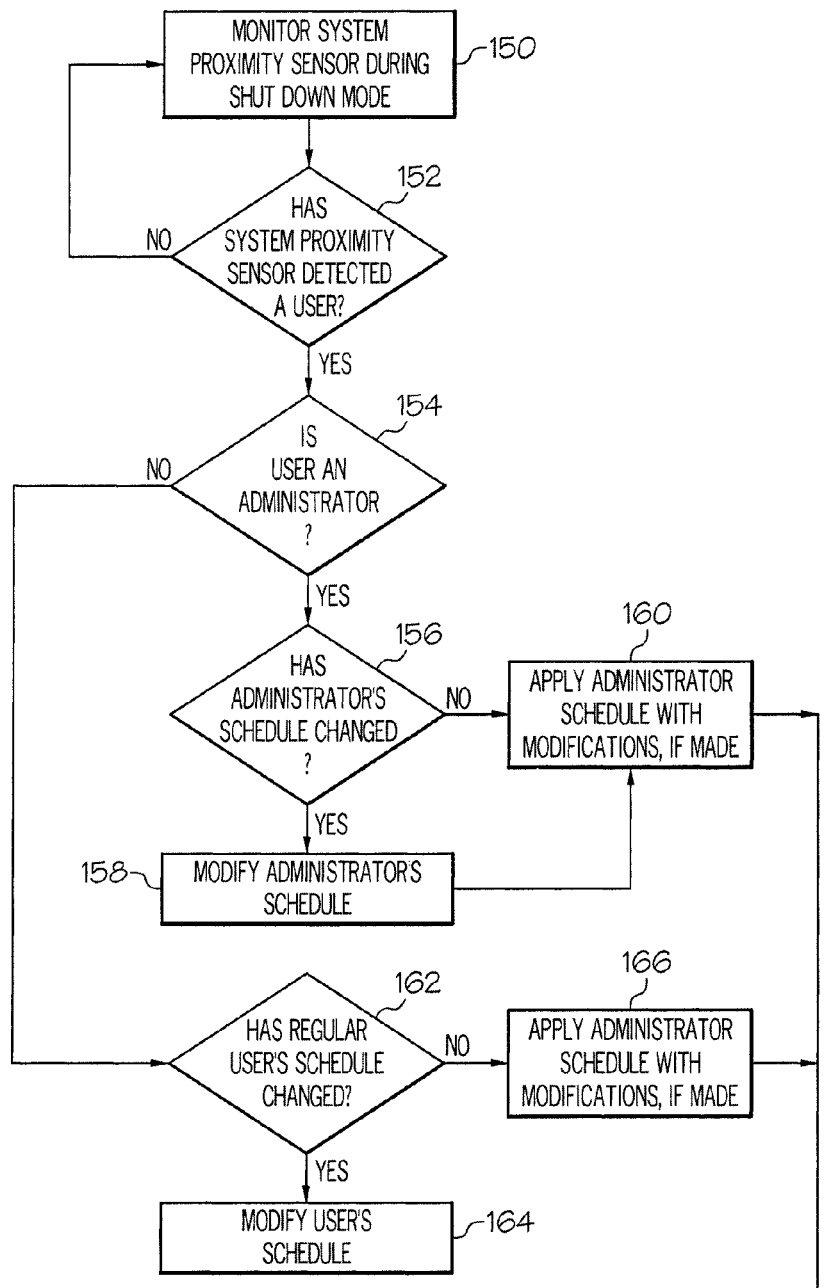
FIGS. 7A, 7B and 7C, illustrate one possible configuration of an automated electrical device control system where one of the users is an administrator and the remaining users are non-administrators.
Figure 7B:
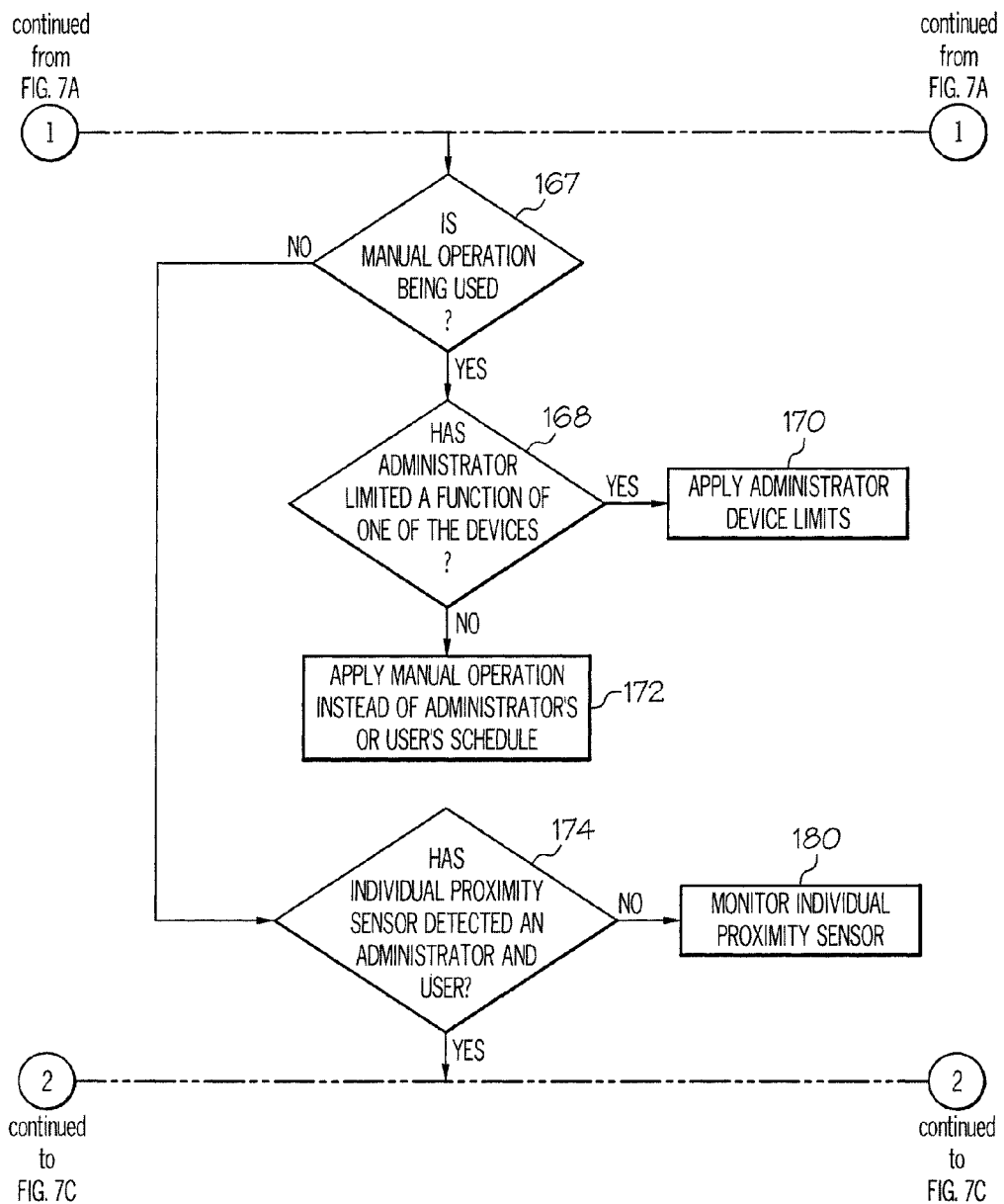
Figure 7C:
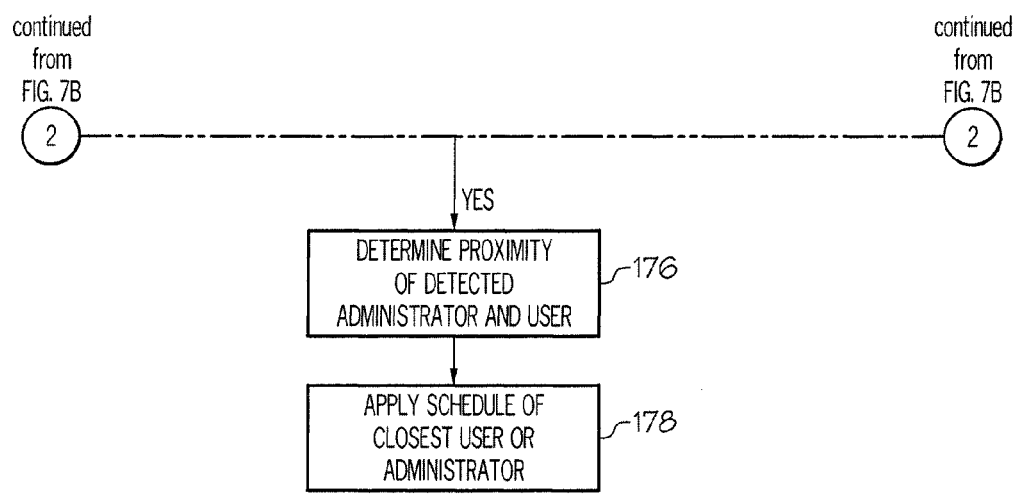

As previously described with respect to FIG. 5, the system is configurable to determine whether a user is designated as an administrator. If so, the system 10 is configured to recognize the difference between a non-administrative user and an administrator. FIGS. 7A, 7B and 7C, illustrate one possible configuration of the system 10 where one of the users is an administrator and the remaining users are non-administrators. To illustrate such a configuration, it is assumed that the system is in a "shutdown" mode which occurs when all of the users have left the premises, for instance when parents have gone to work and children have gone to school. In this case, the system sensing that all users, including the designated administrator have left the premises, the system moves to the shutdown mode, which has either been determined through the learning process or established with input from the administrator.

Once in the shutdown mode, the system monitors, through the use of a proximity sensor, for the return of a first one of the users, whether the administrator of one of the non-administrative user (block 150). The proximity sensor, in different embodiments, is located at the entrance to the residence or in the residence at the wall plate 16 closest to the entrance. If the proximity sensor determines that an administrative user or a non-administrative user has been detected (block 152), then the system determines whether the user is an administrator (block 154). If a user has not been detected, the system continues the monitoring as block 150. If the user is an administrator, the system determines whether the administrator's schedule has changed when compared to the previously stored schedule (block 156). If the administrator's schedule has changed, the administrator's schedule is modified (block 158) from the previously stored schedule and is applied. In any event, the administrator's stored schedule or modified schedule is used by the system to control the electrical devices (block 160).

If at block 154 it is determined that the user is a non-administrative user, it is determined at block 162, whether the non-administrative user's schedule has changed when compared to the previously stored schedule (block 162). If the non-administrative user's schedule has changed, the non-administrative user's schedule is modified (block 164) from the previously stored schedule and is applied. In any event, the non-administrative user's stored schedule or modified schedule is used by the system to control the electrical devices (block 166).

Once the schedules of the administrator and the non-administrative user have been applied, the system determines whether manual operation is being used (block 167). If so, the system determines whether the administrator has limited a function of one of the controlled devices (block 168). If yes, then the administrator's device limits are applied at block 170. Such a feature is useful, where the administrator is a parent who has limited the amount of time a television or computer is used during a day. For instance, if a predetermined total amount of television time (set by the administrator) has been exceeded, then the system will not enable turning on of the television. In this embodiment, the system removes power from the television by adjusting the state of the relays 70 or 76 to disconnect the power needed to turn the television on. If the function of the device has not been limited, manual operation is allowed (block 172).

The system 10 in different embodiments continues to monitor the proximity sensors in the residence, if manual operation is not being used as determined at block 166. If one of the proximity sensors detects the presence of an administrator and user (block 174), then the system determines the proximity of each of the administrator and non-administrative user to the proximity sensor (block 176). Depending on which of the administrator or non-administrative user is closest to the proximity sensor, the system applies the schedule of the closest person (block 178). If no non-administrative user or administrator is detected, the system continues to monitor the proximity sensors by responding to signals generated by the sensors when necessary (block 180).

Each of the units 12, in different embodiments, includes the proximity sensor that allows the units 12 to determine when a user is near a specific device 12. In an exemplary embodiment, each of the units 12 measures the strength of a wireless signal from a user communication device 20 to determine the proximity of a user 33 to a specific device. Other methods of determining the proximity of a specific user, in different embodiments, are utilized. For example, the user communication device 20, in one embodiment, determines a location of the device 20 using the Global Positioning System or other comparable system (GLONASS, Galileo, etc.) and transmits the location to the cloud computing system 32 which then relays the location of the user with respect to one or more of the units 12, or typically the appropriate device 12 which is the closest to the user. In this embodiment, the proximity sensors determine proximity through signal strength provided by the user's devices through Bluetooth, wi-fi or other signals transmitted and received.

Using proximity, location, and schedule data, the units 12 are configured to power on and turn off specific devices based on predetermined rules. For example, if a user 33 exceeds a predetermined distance from the user's house, the devices controlling the lights, in one embodiment, are configured to turn off all of the lights in the house if the time is between the hours of 8 am and 5 pm, and some of the lights if the time is between the hours of 6 pm and 6 am. The rules associated with the units 12 are also based on specific users. For example, a specific device 12, in one embodiment, is configured to turn on a device when a first user gets to within 15 feet of the specifically identified device. Proximity of a user to a device is determined using the Bluetooth module 58 of the communication circuitry 56 in one of the control units 12. In other embodiments, other means of determining proximity include communication protocols, including those described herein such as GPS.

The same device 12, in this embodiment, is configured to turn on the same item when a second user stays within 10 feet of the specific device 12 for more than 90 seconds. When it is determined that there are no users present in the home, the system 10 places the house in "shutdown mode" as previously described, where everything that the user has not specified to be turned off is turned off therefore allowing the user to conserve electricity.

Figure 8:
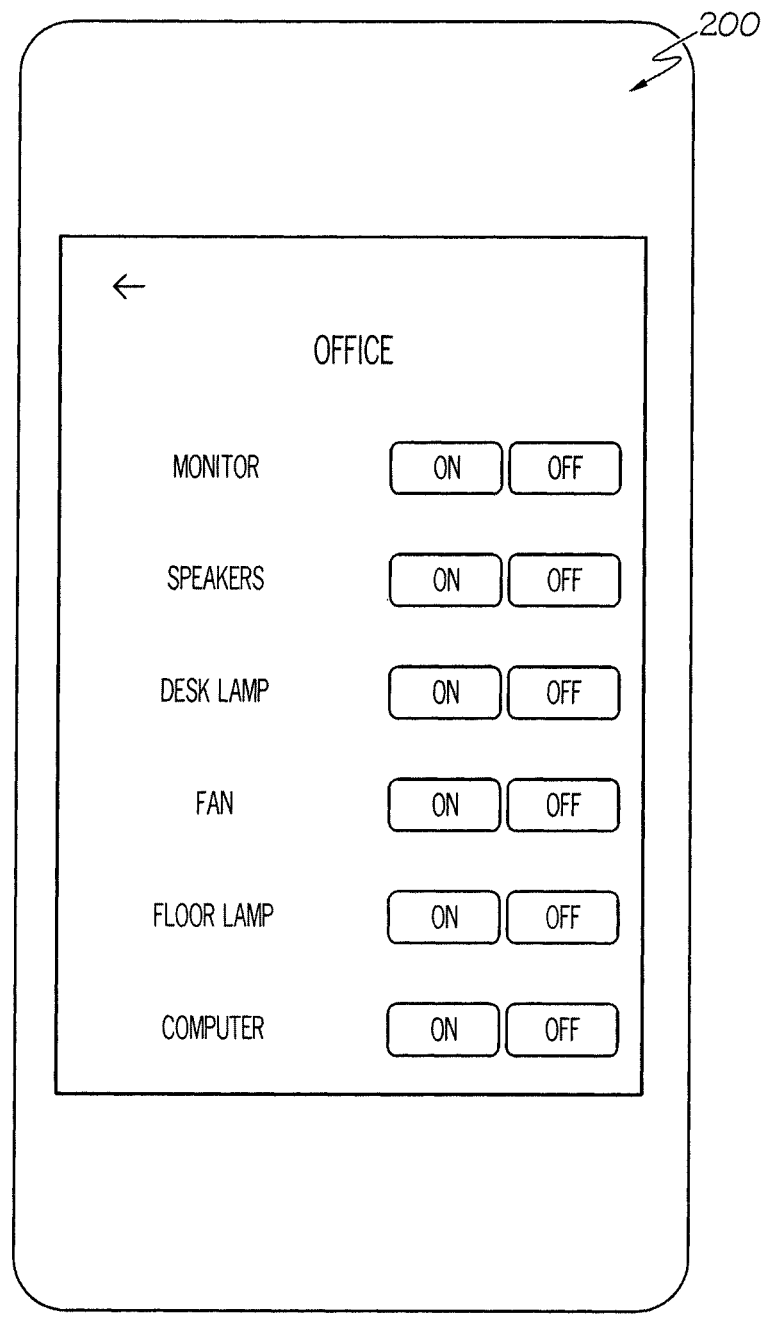
FIG. 8 illustrates a user interface screen, displaying a menu of electrical devices located within an office, which is displayed on a client device.

The client application residing on one of the client devices include a plurality of user interface screens illustrated in FIG. 8-12. As illustrated in FIG. 8, a user interface screen 200, which is displayed on the device client 20, identifies each of the units 12 by a text identifier associated with the electronic device 34 which is being controlled, for instance, speakers, desk lamp and fan. The identifiers, in other embodiments, are random, or pseudo-random, codes associated with the devices, such as DEVICE_KJT723. In an exemplary embodiment, the device identifiers are automatically received by the application from the units 12 based on the proximity of the client 20 and user 33 to the units 12. It is contemplated, however, that the user, in different embodiments, manually enters a unique code to identify a specific device 12 that is to be controlled.

In one embodiment, the user 33 enters the time schedule for a specific appliance and the user's communication device 20 wirelessly transmits a user identification (ID) code associated with the user's account to the selected device 12 along with a requested on time and off time. The user ID code transmitted to selected device 12, in one embodiment, is the same as a username adopted by the user when setting up the system, although a username is not required. In an exemplary embodiment, the user communication device 20 also transmits the user ID code and on times and off times to the cloud based computing system 32 that stores the user ID. Alternatively, the user communication device 20 transmits the user ID and start-up time only to the cloud based computing system, which then forwards the data to a specifically identified device 12. In addition to allowing a user to control the units 12, and therefore the electrical devices 34, from a distance, the cloud computing system 32 also acts to save the user's preferences in the event that the user's communication device and/or the units 12 are lost or damaged. Based in part on the user input schedules the units 12 control the specified appliances 34 to which the units 12 are connected. In another embodiment, because the client device 20 is operatively connected to the cloud 32, a user controls electrical devices 34 at the building when located at a distance where proximity sensors are not effective and the only communication is through the cloud 32. For instance, a user on vacation sets a furnace to increase the temperature in the house so that the house is at the desired temperature upon arrival of the user.

As can be seen from the user interface screen 200, each of the units 12 is controllable by being configured to be manually scheduled to be manually turned on or off. Selection of the buttons at the user interface screen 200 manually turns on or off the associated appliance 34 through control by the units 12. The application residing in the communication device 20, which is being used by the user, is configured to store the manually controlled operations as well as the times at which units 12 manually controlled operations occur, and therefore the electrical devices 34 are turned on and off. This information is stored in the memory of the communication devices 20 and in the cloud 32. In addition, the same screen 200 including one and off times is used to provide a manually entered time schedule, as opposed to the previously described learned time schedule.

Because each user has access to the system application and can program the system application to his or hers time schedule, a schedule for one or more of the units 12 may be in conflict. For example, a first user may schedule a light bulb to turn on at 7:00 am and turn off at 8:00 am while a second user may schedule the same light bulb to turn on at 6:45 am and turn off at 7:30 am. The device 12 is configured, in one embodiment, to resolve the schedule conflicts based on a plurality of secondary factors. The designated administrator, for instance, overrides the schedule input by the other user. In the given example, if the second user was an administrator, the administrator's schedule overrides the first user's schedule and the light bulb would be shut off between 7:30 am and 8:00 am. In addition to resolving conflicts based on the classifications of the users, the units 12, in different embodiments, resolve schedule conflicts based on the proximity of the users so that the user who is closest to the device 12 that has the dominant schedule.

In other embodiments, manual operation of a controllable input device, such as a toggle, a switch, or user interface at the units 12 generally overrides any previously entered rules for controlling the device. In addition, manual control is achieved in other embodiments, through the user interface 200 of FIG. 8. In other configurations, the predetermined schedule overrides the manual input as previously described. For example, if an administrative user desires to limit the number of hours per day that a specific device is utilized, such as a television or gaming console, the device 12 is programmed to ignore even operation responsive to a manual input designating a desired operation. For example, in other embodiments, the administrator programs a light to be off during a child's nap time and to be unaffected by manual input through a wall or other light switch. In this situation, the programming prevents the light from being turned on by the child who does not wish to take the nap.

Each of the units 12, in different embodiments, transmits power usage data back to the user communication devices either wirelessly or through the cloud computing system. The power usage data allows the user to remotely tell which of the electrical devices 34 is currently operational or being used. For instance, some appliances draw power continuously, but at different levels, depending on use. The units 12, in different embodiments, include the Hall current sensors (amp meters) which measure the flow of electrical current to the items controlled by the units 12. For specific appliances 34, the units 12 to which the appliances are connected, are programmed to provide an alert, either at the device 12 or at user communication device 20, if the device 12 is enabled to deliver flow of electrical current, but no current is being measured. For example, if a device 12 is allowing electrical current to flow to a light bulb, but no current flow is measured, the user, in one embodiment, receives an electronic message, such as an SMS text message, or email alert, indicating that a bulb has burnt out and needs to be replaced. The system 10, in other embodiments, provides monthly electricity usage reports for each user broken down by item (blender, television, etc.), by item class (lighting, kitchen appliances, etc.), or by room (basement, bedroom, etc.).

In another embodiment, the units 12 are configured to briefly test electrical current flow through an item at predetermined times and provide a user alert if no current flow is detected. For example, a coffee maker often includes an on/off switch that enables a user to control the operation of the coffee maker. As an example for instance, on one morning, the user manually turns off the coffee maker when finished but neglects to turn it on for the next morning. In that situation, the following morning the device 12 allows electrical current to flow to the coffee maker, but the on/off switch will prevent the operation of the coffee maker and inconvenience the user. If the device 12 to which the coffee maker is connected and the system is configured to provide a test current, for instance ~1 second the previous evening and detected no current flow, the system 10 transmits to the user an email or SMS text reminder to turn the coffee maker on so that coffee is made for the following morning. Other communication platforms, in different embodiments, are also used to communicate device status including social media platforms such as Twitter, Instagram, and Facebook.

In addition to controlling electric items based on a user input schedule and a proximity of the user to the device 12, the system has the ability to learn a user's schedule and automate the control of an item accordingly as described above. The user, carrying their user communication device, controls the operation of the electrical devices 36 according to the user's normal routine. Based on the proximity of the user communication device, the device 12 determines which user has turned on or off a specific device at a certain time. The system 10 learns the user's routine and is able to automate these tasks according to the routine. For example, if a user normally turns on a bathroom heater from 7 am to 8 am on weekdays in the winter, after the device 12 has learned the user's schedule to a reasonable confidence level, over a period of 2 weeks for instance, the device 12 automatically turns on the bathroom heater at 7 am. In addition to monitoring a user's actual usage of a particular item, the system 10 enables users to enter a schedule for when specific items are to be turned on or off which will help the system better learn the user's schedule.

Users' routines, however, do change over time and the system 10 continually monitors the users' activities for anomalies, changes, and differences from the schedules. From the previous example, if the bathroom heater was automatically turned on at 7 am and the user shut the heater off a few minutes after 7 am, the system 10 would detect and record a difference in the user's schedule. The following day, the device 12 would still turn on the bathroom heater at 7 am since the device 12 was unable to determine if the previous day's activity was an anomaly, such as a snow day in which the user slept in, or whether the change was a significant or longer term change in the user's routine which requires a change of the learned schedule in the device 12. If the user continues to turn off the bathroom heater every day a few minutes after 7 am, the device 12 and system 10 determine that the change is not an anomaly in the user's routine and adjusts the schedule stop turning on the bathroom heater at 7 am on weekdays.

The units 12, in other embodiments, also communicate with other units 12 to refine the automatic control of appliance connected thereof. For example, consider a user's morning routine which is to turn off a coffee pot at 7:30 am, use a microwave for five minutes afterwards, and then sit down and turn on a television in another room. If the user is running late, i.e. outside their usual routine, and the coffee pot is not shut off until 7:40 am, the device 12 controlling the coffee pot communicates with the device 12 controlling the television to adjust the schedule such that the television is not turned on until a quarter till eight, five minutes after the coffee pot was turned off. In this way, the sequence of events is maintained at the predetermined schedule or sequence of events, but all are delayed by the same amount of time due to the first event being delayed.

Figure 9:
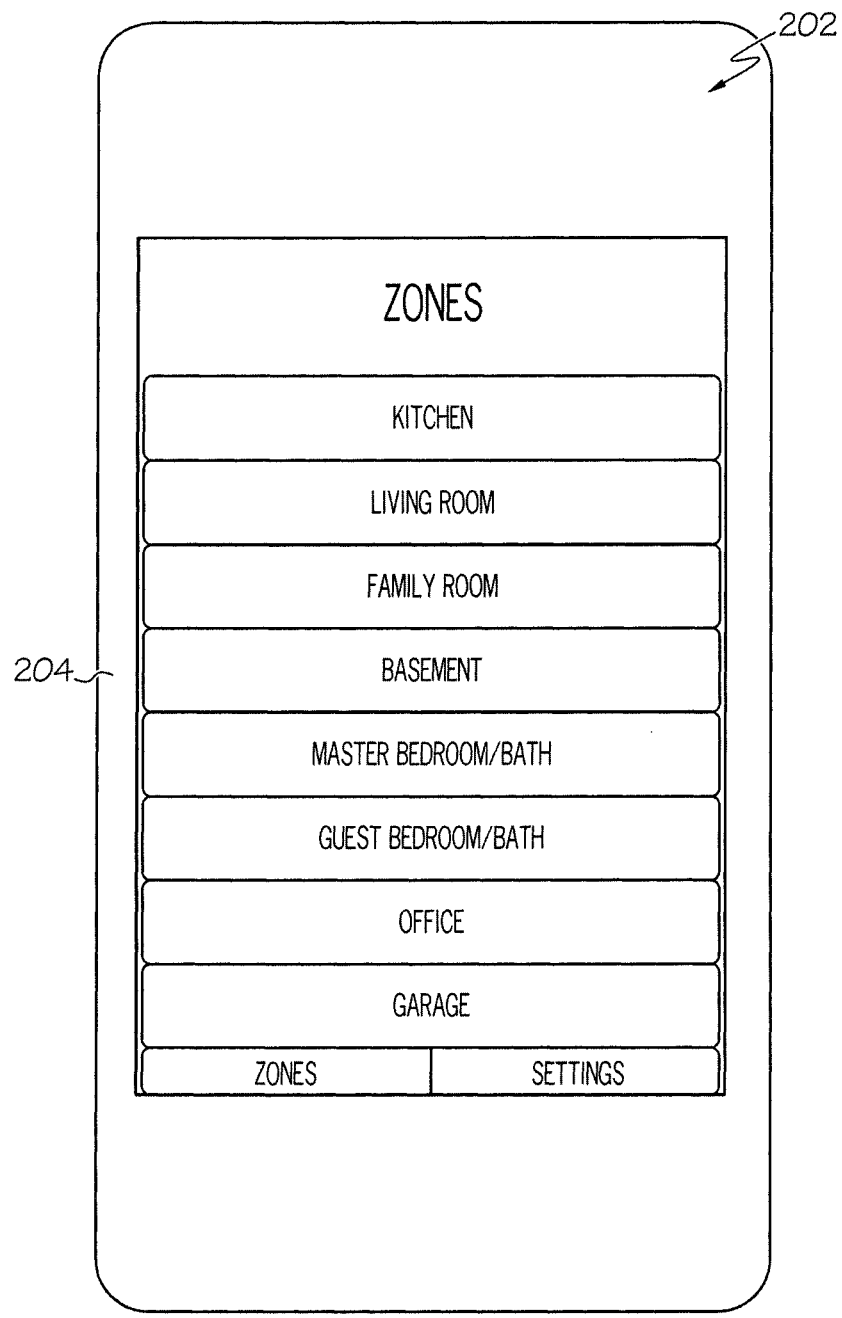
FIG. 9 illustrates a user interface screen displaying a menu of a control application to enable a user to select and control electrical devices based on a location or zone at a building.

FIG. 9 illustrates an example of a user interface screen 202 displaying a menu 204 of a control application to enable a user to select and control the units 12 based on their location. The locations in the menu are shown as rooms in a house. Consequently, control of the appliances in each of the rooms is configurable by the user if desired. Any one of or all of the appliances 34 connected to one of the units 12 are controllable through the menu 204. For instance, the user can configure the application to control all of the units 12 connected to lights in a specific room or area, such as a basement. In one configuration, the lights are programmed to be turned on or off with a single command from the user control device 20. Additionally, all of those units 12 are configured to be programmed to turn on or off on a specific schedule or in response to a specific trigger. For example, when a user turns off the lights to a set of stairs leading to the basement, all of the lights in the basement are automatically turned off after 60 seconds to conserve electricity in case one of the other basement lights has been accidentally left on.

Figure 10:
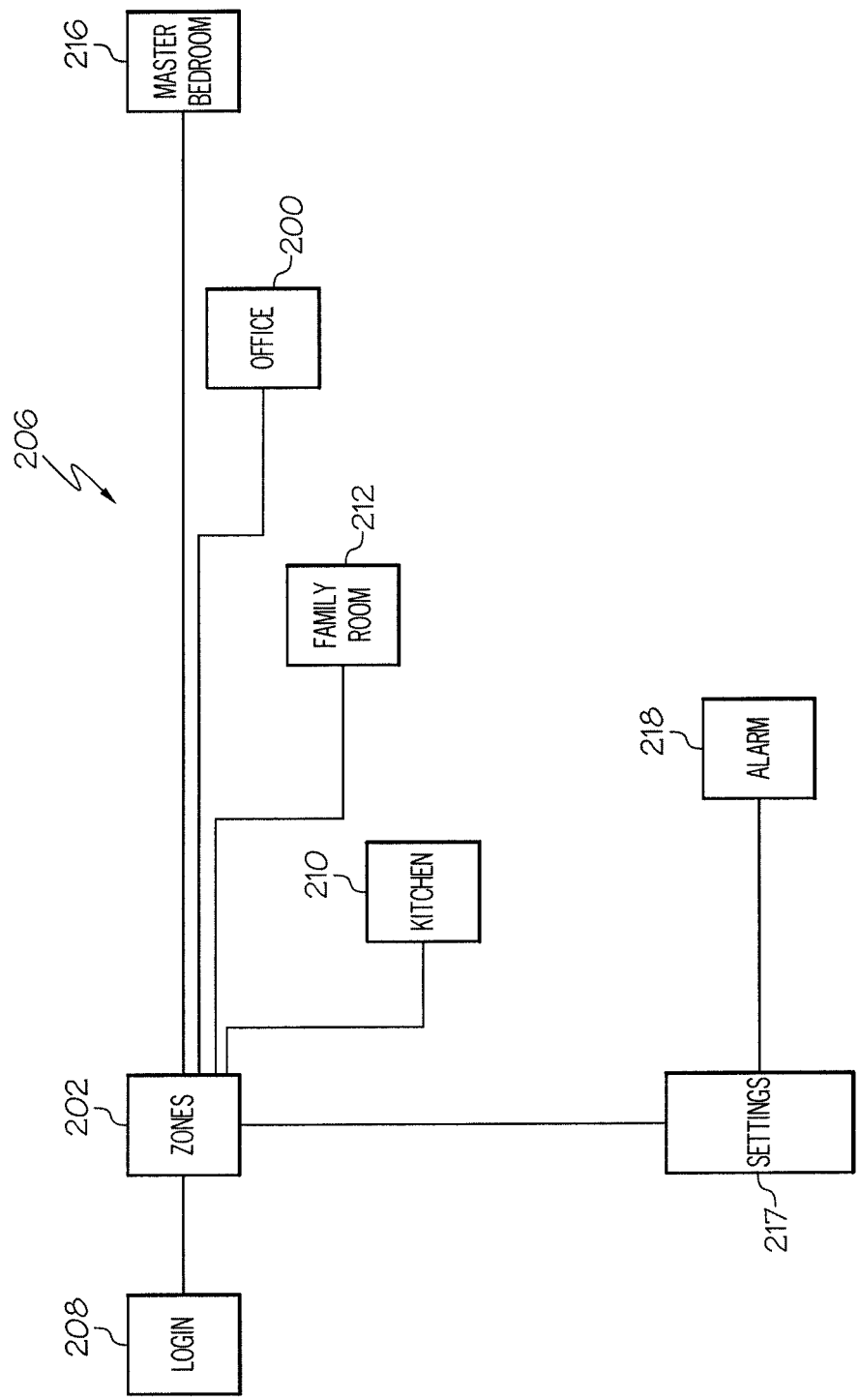
FIG. 10 illustrates a schematic diagram of a hierarchal selection menu that enables a user to quickly select the electrical devices in each of the zones or rooms to be controlled.

FIG. 10 illustrates a schematic diagram of a hierarchal selection menu 206 that enables a user to quickly select the appliances in each of the rooms to be controlled. For instance, after entry into the application is enabled through a login screen 208, the zones in the house screen 202 are displayed. From the zones screen 202, the menu 204 enables a user to access a user interface screen for each of the rooms, such as a kitchen screen 210, a family room screen 212, the office screen 200, and a master bedroom screen 216. Each of rooms or zone screens is configured to display each of the controllable devices within the room or zone, such as illustrated in FIG. 8. A settings user interface screen 217 is accessed by the settings button of user interface 204 of FIG. 9. Additionally, through the use of the hierarchal menu, similar items at different locations may be given the same text identifier without creating ambiguity. From the menu, in one embodiment, the user also implements global controls of the system, such as temporarily disabling all of the units 12 in the house, or indicating that the system is to run on a weekend schedule next Tuesday. A particular user's ability to implement global controls of the system 10 is configured, in one embodiment, by a security level associated with the user. In other embodiments, a user who is listed as an administrator has complete control over the system, while a user classified as a client is not able to adjust the schedules of particular devices or to globally deactivate all of the units 12 in a building. In other embodiments, a zone includes multiple rooms or areas including a commonly controlled area, such as a zone including multiple offices where each of the offices is controlled according to a same schedule during the night. The system is configurable to specify each of the rooms in a building or home and to identify each of the electrical devices being controlled. Consequently, while FIG. 10 illustrates a number of rooms and certain types of rooms, less or more room having different numbers of controllable electrical devices are possible.

Figure 11:
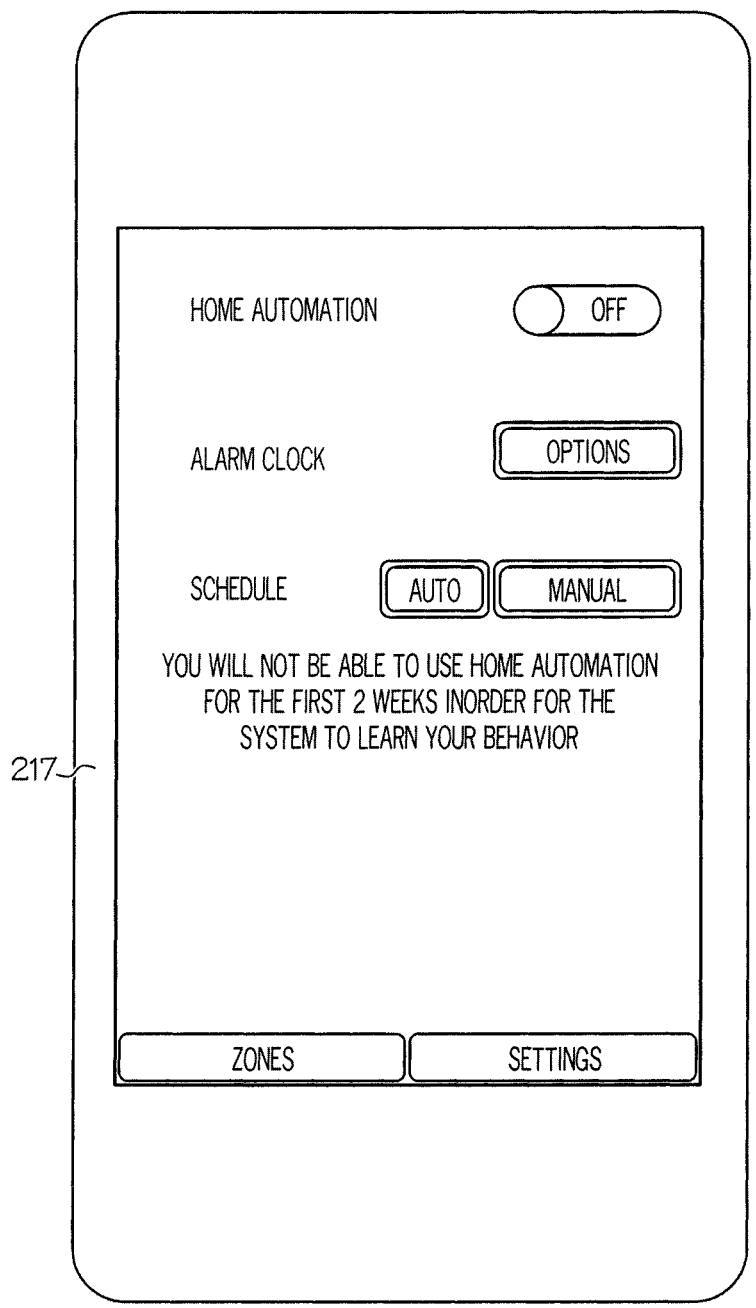
FIG. 11 illustrates a user interface screen, displayed on a client device, configured to provide a configuration of the system.
Figure 12:
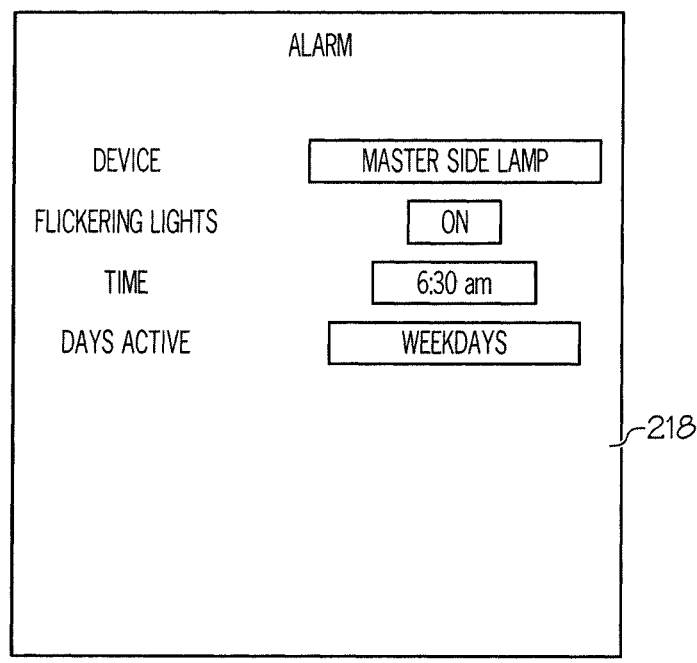
FIG. 12 illustrates a user interface screen, displayed on a client device, configured to provide an alarm function.

The settings screen 217, shown in FIG. 11, includes a button to turn on or off the entire system or whether to automatically or to manually control the schedule of events. In addition, by using the control application, the user may activate an alarm clock feature by selecting the options button of the alarm clock, which provides the user interface screen 218 of FIG. 10, and as further illustrated in FIG. 12, which includes various different user selectable items. The user interface screen 218 includes a device selection button, a flickering lights button, a time button and a "days active" button. In one example, the user sets a clock radio to turn on in a bedroom at 6:25 am on weekdays. If the device 12 controlling the clock radio is not deactivated by 6:30 am, the system 10 escalates the alarm, in response to the user selecting the device "Master Side Lamp" to flicker. At 6:30 am, master side lamp which is controlled by one of the units 12, begins to flash or flicker the lights in the room. The device 12 controlling the clock radio may also be deactivated through the user communication device.

FIG. 13 illustrates an example of the system 10 controlling three items in a single room based on two users. At 9:15 and 9:30 devices A and B are powered on because user 1 is located in the room. However, device C is off because user 1 does not typically use the device and the system 10 has learned that device C is usually not associated with user 1. At 9:45, user 2 enters the room and the system 10 activates device C, because user 2 often uses device C at this time of day. From 9:45 to 10:15 the three units 12 are activated with users 1 and 2 located in the room. At 10:30 user 1 has left the room and the system 10 deactivates device B because user 2 is not associated with device B. User 2 leaves the room at 11:00 and device C is immediately turned off by the system 10. The system also begins a 15 minute countdown before turning off device A. Certain devices with long start-up times may be set to go off after a user has left the room and a predetermined amount of time has passed. Based on the learned user schedule, the system 10 may be configured to immediately deactivate a device when a user leaves a room during a first time period, such as the morning, while waiting 10 minutes to deactivate the device during a second time period, such as the evening.

While the user communication device may actively run processes that control the operation of the outlet box control unit 14, the wall socket control unit 16, and the wall plate control unit 18, in an exemplary embodiment, substantially all of the computer processing is performed within the units 12 while the user communication device occasionally transmits a user ID to indicate the location of the user to the units 12. Occasionally transmitting the user ID requires only minimal power and helps conserve battery power on the user communication device. In another embodiment, the user communication device includes a radio-frequency identification (RFID) tag that is detected by an RFID reader located on each of the units 12. RFID tags readable by the units 12, in different embodiments, are attached to a variety of items and the movement of those items may be used to further optimize the system. For example, if an RFID tag were placed on a dog collar, the system 12 learns that when the user communication device and the dog collar simultaneously leave through a front door, all items inside the house should be powered down for 50 minutes, and a light on the front porch should be turned on in 45 minutes, since both the dog and owner are taking a walk and will return in approximately 50 minutes. As can be seen, the front porch light has been programmed to turn on approximately five minutes before the return of the dog and owner.

Figure 14:
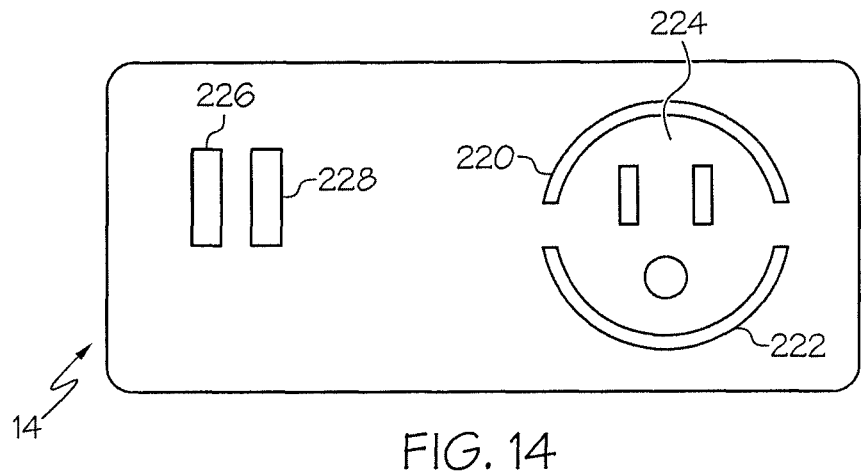
FIG. 14 illustrates one embodiment of a front face of an outlet box control unit.
Figure 15:
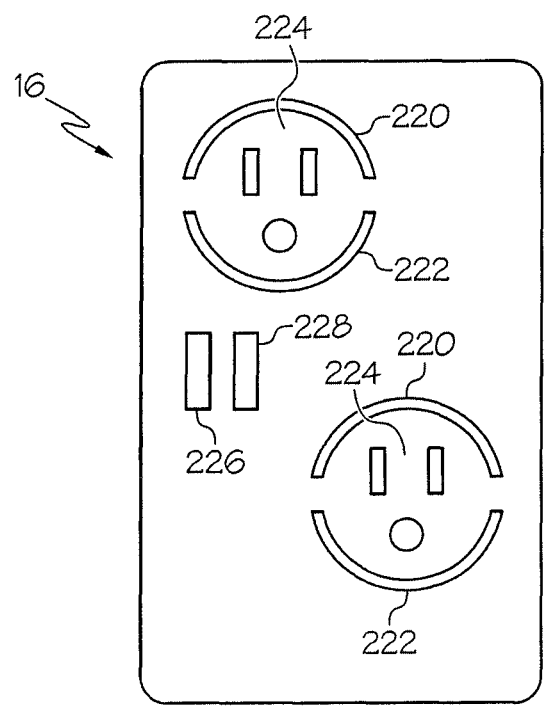
FIG. 15 illustrates one embodiment of a front face of a wall plate switch control unit.
Figure 16:
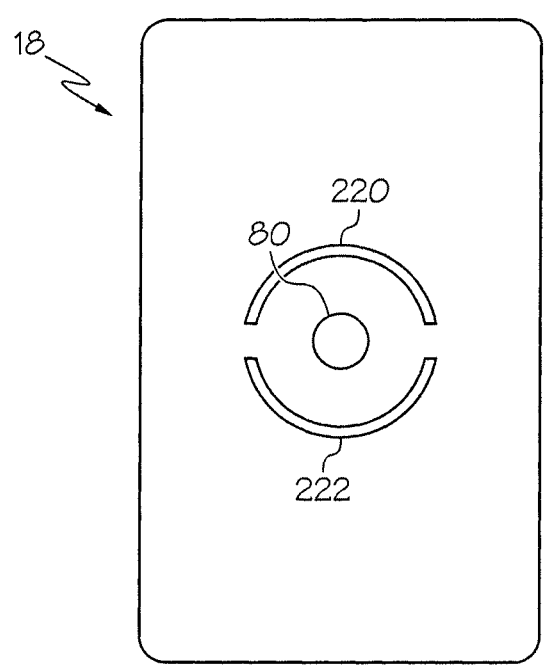
FIG. 16 illustrates one embodiment of a front face of a wall socket control unit.

FIGS. 14, 15, and 16 each illustrate one embodiment of a front face respectively of the outlet box control unit 14, a wall socket control unit 16 and a wall plate switch control unit 18. In each of these embodiments, the LEDs 64 include a first arc 220, or half circle, and a second arc 222, or half circle. In the outlet box control unit 14 and the wall socket control unit 16, each of the first and second arcs 220 and 222 surround a wall plug receptacle 224. The first arc 220 and second arc 222 are illuminated to alert a user that a text message has been received on one of the client devices 20. For the wall plate switch control unit 18, the first and second arcs 220 and 222 surround the button 80.

In one embodiment, the alert is generated on every control unit at a building when any of the users receives a text message. In another embodiment, the alert is generated specifically for a user and only on the control unit or units near location of the user. For instance, if a first user is sensed to be in the kitchen, a second user is sensed to be in a family room, and a text message is received for the first user, the LEDs 64 of only the control units in the kitchen are illuminated. The illumination signifying the receipt of a text message, in different embodiments, is continuously on for a predetermined period of time or flashes on and off for a predetermined time. In one embodiment, each of the control units includes a photosensor which illuminates when the room is sufficiently dark and flashes on and off when the text message is received.

In the outlet box control unit 14 and wall socket control unit 16, a first port 226 and a second port 228 are accessible through the front face of the wall socket control unit 16, each of which corresponds to the USB charging port 55 of FIGS. 2 and 3. In different embodiments, the first and second ports 226 and 228 provide charging only for the battery of a user device 20. In other embodiments, one or both of the ports 226 and 228 provide a hardwired communication link.

The outlet box control unit 14 is generally shaped as a rectangular prism having a two or three pronged electrical plug extending from the back for insertion into a wall outlet. Both the wall socket control unit 16 and wall plate switch control unit 18 include generally planar wall plates which are substantially flush with or which extend slightly away from a wall to which each of the wall socket control unit 16 and the wall plate switch control unit 18 are affixed. The remaining electrical and/or electronic hardware is inserted behind a wall generally between the wall studs.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical device control system for controlling the operation of a plurality of electrical devices located at a building and configured to communicate with a plurality of individual client devices wherein each of the plurality of individual client devices is utilized by a different one of a plurality of users, the control system comprising;
  a cloud-based user application configured to be accessible by each of the plurality of the client devices, the cloud-based user application configured to transmit and to receive user data through the cloud-based user application and provided by a user;
  a first control unit including: (i) an electrical power connection configured to provide electrical power to one of the electrical devices, the electrical device including one of a home appliance, a consumer electronic device, and a light; (ii) communication circuitry configured to communicate with the user application, the communication circuitry including one of a Bluetooth module and a wi-fi module; and (iii) control circuitry operable to:
    access data provided as input data to the client device;
    change a state of the electrical device; and
    determine a change in the state of the electrical device;
  a second control unit including: (i) a user input component configured to respond to a user input, wherein the user input includes a signal strength of a signal provided by the individual client device; (ii) communication circuitry configured to communicate with the user application, the communication circuitry including one of a Bluetooth module and a wi-fi module; and (iii) control circuitry operable to:
    generate a signal in response to the user input;
    determine an identity of the user based on the generated signal; and
  a third control unit including: (i) an electrical power connection configured to provide electrical power to one of the electrical devices; (ii) a power port configured to provide electrical power to the client device; (iii) communication circuitry configured to communicate with the user application, the communication circuitry including one of a Bluetooth module and a wi-fi module; and (iv) control circuitry operable to:
    change a state of the electrical device;
    determine a change in the state of the electrical device;
  wherein each of the communication circuitry of each of the first control unit, the second control unit and the third control unit is configured to communicate with each of the other first control unit, the second control unit and the third control unit;

wherein at least one of the first, second, and third control units includes: (i) an illumination device operatively coupled to the user application and configured to provide a visible alert signal; and (ii) a proximity device configured to detect a proximity of the closest of each of the plurality of individual client devices to the proximity device, wherein the proximity device includes one of a laser sensor, a motion sensor, and a signal strength sensor of the control unit, the signal strength sensor configured to determine a signal strength provided by each of the plurality of individual client devices; and wherein the proximity device is configured to determine a closest one of the plurality of individual client devices to the proximity device and the communication circuitry of at least one of the first, second, and third control units is operable to provide a communication to the closest one of the plurality of individual client devices; and wherein the at least one first, second, and third control units including the illumination device and the proximity device is configured to execute program code to:
determine the receipt of a communication directed to one of the plurality of the individual client devices through the cloud-based system application;
determine if the first one of the plurality of individual client devices is closest to one of the first, second, and third control units or a user of the first one of the plurality of individual client devices is closest to one of first, second, and third control units;
illuminate the illumination device of the closest one of the first, second, and third control units based on the result of the second determine step; and
not illuminate the illumination device of the other of the first, second, and third control units not closest to the first one of the plurality of individual client devices or not closest to the first one of the plurality of individual client devices.

2. The electrical device control system of claim 1 wherein the first control unit includes electrical prongs extending from the device configured to be inserted into an electrical socket and an outlet disposed in the unit, the unit configured to receive an electrical plug of one of the plurality of electrical devices.

3. The electrical device control system of claim 2 wherein the second control unit includes a digital communication port configured to enable digital communication between the client device and at least one of the first, second, and third control units.

4. The electrical device control system of claim 1 wherein the communication circuitry of at least one of the first, second, and third control units is configured to communicate using the standard interne protocol suite to link to the cloud based user application.

5. A building automation system for controlling the operation of a plurality of electrical devices located at a building and configured to communicate with a plurality of individual client devices, wherein each of the plurality of individual client devices is utilized by a different one of a plurality of users, comprising:
a cloud based system software application configured to control the plurality of electrical devices, the cloud based system application being located in a cloud based computing system;
a user software application configured to reside on each of the plurality of the client devices, the user application configured to: 1) receive individualized user data specific to the user of one of the plurality of individual client devices and 2) to transmit the individualized user data to the cloud-based system application;
a plurality of control units each including (i) an electrical power connection configured to provide electrical power to an electrical device including at least one of a home appliance, a consumer electronic device, and a light; (ii) communication circuitry configured to communicate with the user application and the cloud based system application, the communication circuitry including one of a Bluetooth module and a wi-fi module; (iii) an illumination device operatively coupled to the user application and configured to provide a visible alert signal; a (iv) a proximity device configured to detect a proximity of each of the plurality of individual client devices to the control unit, wherein the proximity device includes one of a laser sensor, a motion sensor, and a signal strength sensor, the laser sensor and motion sensor configured to detect the presence of a user, and the signal strength sensor configured to determine a signal strength provided by each of the plurality of individual client devices; and (iv) control circuitry configured to execute program code to:
determine the receipt of a communication directed to a first one of the plurality of the individual client devices;
determine a location of each of the plurality of individual client devices with respect to each of the plurality of control units detected with the proximity device;
determine which one of the plurality of control units is closest to the first one of the plurality of individual client devices;
illuminate the illumination device of the determined one of the plurality of control units closest to the first one of the plurality of individual client devices; and
wherein the cloud based system application is configured to execute program code to:
learn and store a user schedule for each of the plurality of users using the plurality of individual client devices, wherein the learned user schedule is determined according to electrical device usage patterns made by the user;
store a manually entered user schedule for each of the plurality of users using one of the plurality of individual client devices;
control the operation of the electrical device connected to each of the plurality of control units according to one of the learned user schedule and the manually entered schedule;
determine a conflict between user schedules based on a classification of the users and the proximity of one of the plurality of individual client devices or user with respect to one of the plurality of control units;
resolve the determined conflict according to predetermined rules; and
control the operation of the electrical device connected to one of the plurality of control units based on the resolved conflict.

6. The building automation system of claim 5 wherein the proximity device includes the signal strength sensor and one of the laser sensor and the motion sensor.

7. The building automation system of claim 6 wherein the control circuitry configured to execute program code includes being configured to illuminate the illumination device of the determined one of the plurality to provide an alert including:

i) an electrical device alert to indicate a status of one of the plurality of electrical devices; and ii) an individual client device alert to indicate the receipt of a message at the individual client device.

8. The building automation system of claim 7 wherein the cloud based system application is further configured to execute program code to:
provide a usage report for each of the plurality of users, wherein the usage report includes electricity usage and is arranged to indicate specific electricity usage by each of the plurality of users.

monitor usage of each of the plurality of electrical devices to determine usage of by each of the plurality of users; and 9. The building automation system of claim 8 wherein the cloud based system application is further configured to execute program code to:
provide the usage report to include electricity usage by the type of electrical device and electricity usage for each arranged to indicate a room of the building in which the electricity usage occurred.

10. The building automation system of claim 9 wherein the cloud based system application is further configured to execute program code to:
transmit current electricity usage to each of the plurality of user communication devices to indicate which of the plurality of the electrical devices is one of: 1) currently operational; and currently being used.

\* \* \* \* \*